Nov. 7, 1939.   G. E. MILLER   2,179,267
DIFFERENTIAL FLUID PRESSURE LINE CONTROL
Filed July 13, 1938   2 Sheets-Sheet 1

Inventor
George E. Miller

By Owen D Owen,
Attorneys

Inventor
George E. Miller

Patented Nov. 7, 1939

2,179,267

UNITED STATES PATENT OFFICE 2,179,267

DIFFERENTIAL FLUID PRESSURE LINE CONTROL

George E. Miller, Findlay, Ohio, assignor to The Buckeye Traction Ditcher Company, Findlay, Ohio, a corporation of Ohio Application July 13, 1938, Serial No. 219,054

21 Claims. (Cl. 192—4)

This invention relates primarily to mechanism for controlling the swinging movements of turntables, crane cabs, or the like, wherein the driving means is provided with separate clutches selectively engageable to effect a turning of the table in one direction or the other, and with means for holding the table in any adjusted position when both clutches are disengaged.

The primary object of the invention is the provision of simple and efficient control means for a reversibly driven member, whereby to enhance the practicability and commercial value thereof.

Further objects and advantages of the invention will be apparent from the following description, and from the accompanying drawings illustrating one embodiment of the invention, and in which—

Figure 1:
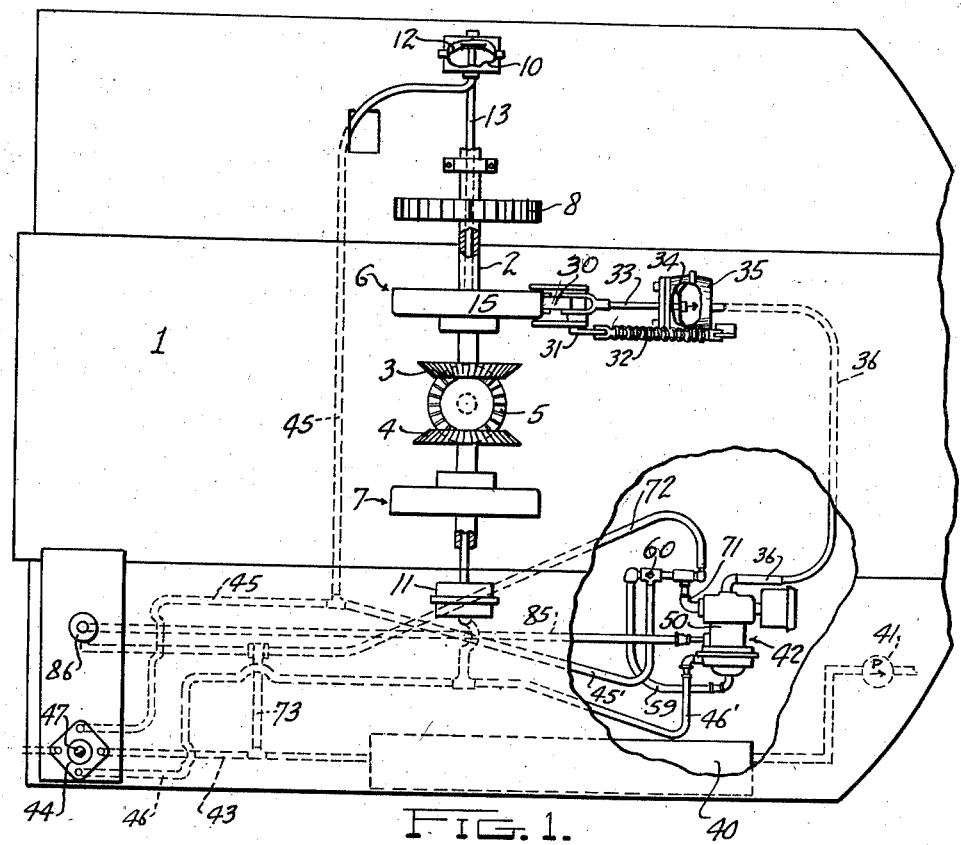
Figure 2:
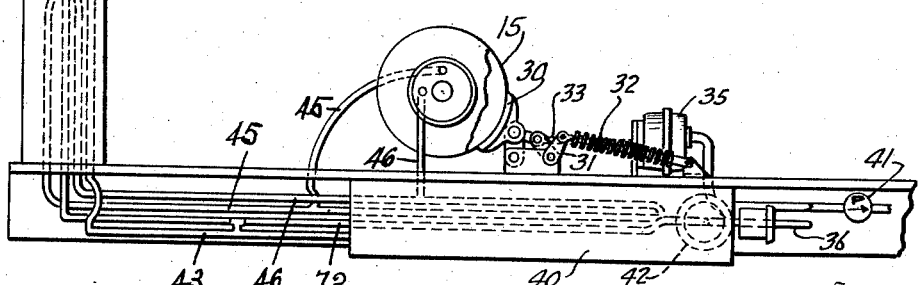
Figure 3:
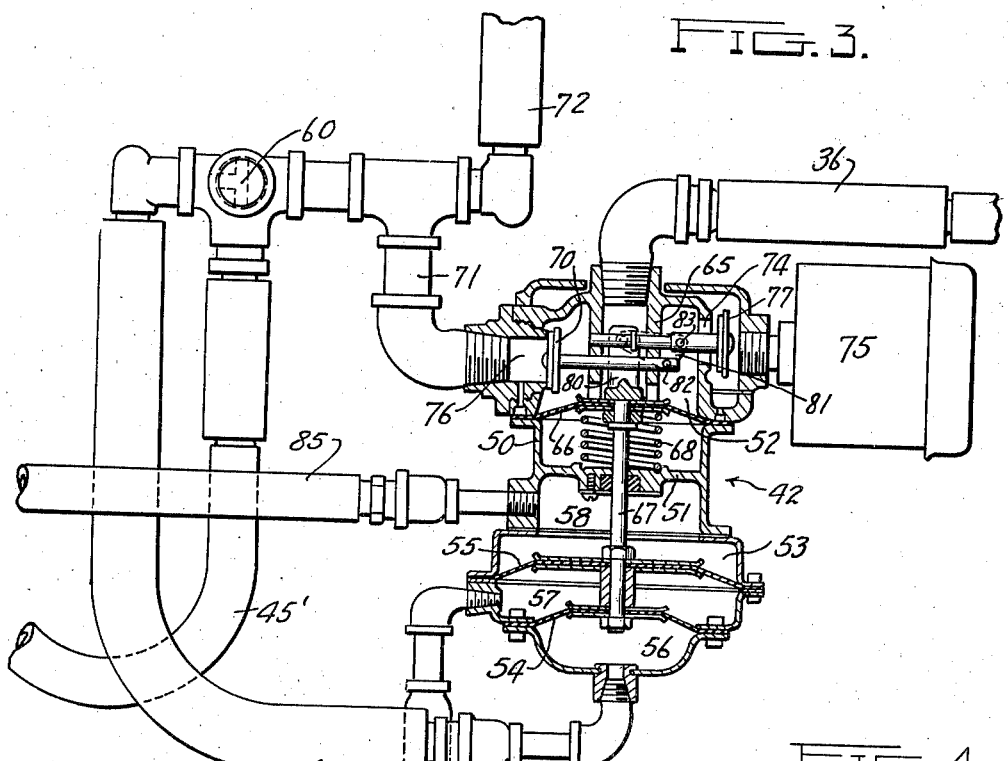
Figure 4:
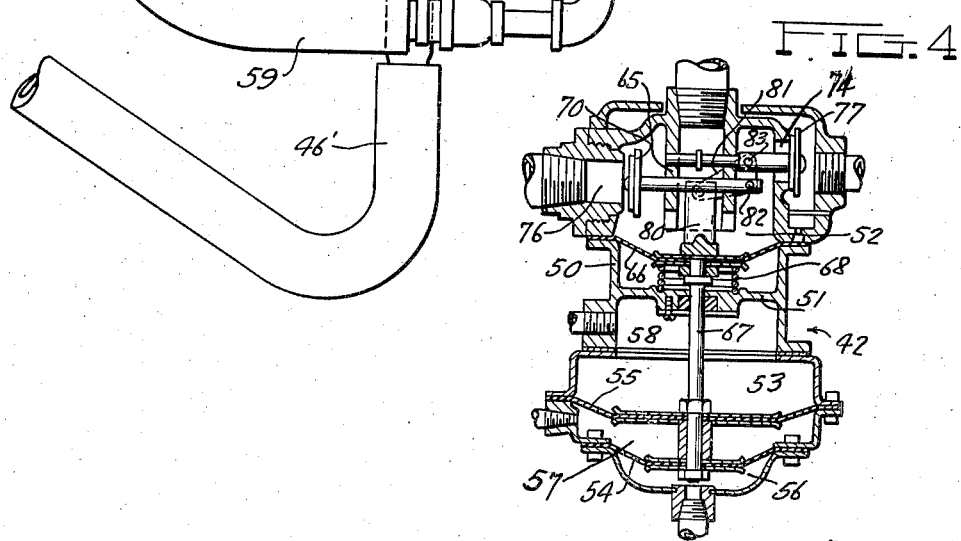

Figure 1 is a more or less diagrammatical plan view, with parts broken away, of a swingingly mounted platform, and of the drive and control means therefor embodying the invention; Fig. 2 is a side elevation thereof; Fig. 3 is an enlarged central sectional view of the relay valve of the control means with the connections thereto fragmentarily shown, and Fig. 4 is a view of the relay valve similar to Fig. 3, with the vacuum valve in open position and the air relief valve closed.

Referring to the drawings, 1 designates a platform mounted for swinging movements and which constitutes the mount for a swinging crane.

The reversible drive for the platform 1, in the present instance, includes a shaft 2 mounted thereon and carrying opposed bevel gears 3, 4, in mesh with a common driven pinion 5 and each having driven connection with the shaft through respective clutches 6, 7. The shaft may be connected to any suitable power source through a driving connection including a gear 8. The bevel pinion 5 has suitable driving connection with the platform, as well understood in the art.

Each clutch 6, 7, is controlled by differential fluid pressure acting on the diaphragms in respective chambers 10 and 11, the diaphragm in each case being vacuum actuated to engage the clutch and being movable to permit a release of the clutch when the vacuum action thereon is absent. Each clutch operating diaphragm, one of which is shown in the chamber 10 and designated 12, is connected to a clutch operating push rod 13, which extends axially into the respective end of the shaft 2 to the associated clutch. The clutches 6 and 7 are of the common or any suitable type, wherein the clutch is normally held released by spring action and is engaged by movement, in vacuum actuated direction, of the associated push rod 13. A clutch suitable for the purpose is illustrated and described in United States Letters Patent No. 2,136,454, dated November 15, 1938.

One of the clutches at least, 6 in the present instance, has a loose driven brake drum member 15 in fixed connection with the gear 3 and having releasable connection with the drive means through the internal clutch mechanism.

The brake means employed for holding the platform against turning, when both clutches are released, comprises, in the present instance for the purpose of illustration, a brake shoe 30 acting against the periphery of the clutch member 15 of the clutch 6 and such shoe is connected and actuated by movements of a bell crank form of lever 31 in link connection therewith. A spring 32, in the present instance of the expansion type, is connected to the lever 31 and operates to normally apply the brake. The lever 31 also has connection through a rod 33 with a diaphragm or piston 34 in a cylinder 35. The outer side of the member 34 with respect to the rod 33 has connection through a line 36 with a controlled vacuum source, as hereinafter described, so that when vacuum action is present within said line, the member 34 is acted on to effect a release of the brake 30 against the tension of the spring 32.

The vacuum source, in the present instance, includes a tank 40, wherein vacuum is maintained by a pump 41. This tank is in normally closed communication with the line 36 of the brake cylinder 35 through an automatic relay valve 42, and is in manually controlled normally closed communication with the clutch vacuum chambers 10 and 11.

In the present instance, the tank 40 has selectively controlled communication with the chambers 10 and 11 through a tube 43 leading to a common control valve 44 and from such valve through tubes 45 and 46 leading to the respective chambers 10 and 11. This control valve is a well-known type and is shown and described in my co-pending application Serial No. 157,940, which has matured into the aforesaid patent, and is adapted to close communication between both chambers 10 and 11 and the tank 40 and to open such chambers to the atmosphere when the control handle 47 is in neutral position, and to open communication between one or the other of said chambers and said tank when the control handle is moved in one direction or the other, and at the same time to close the atmospheric communication with the respective chamber that is open to the vacuum source. In other words, when the control handle 47 is moved in one direction from neutral position, the clutch 6 is engaged, and when moved in another direction from such position, the clutch 7 is engaged.

The novel feature in the present invention resides particularly in the brake control through the medium of the relay valve 42. This valve, in its present embodiment, comprises a housing 50 divided by a partition 51 into two spaced compartments 52 and 53 (Fig. 3). The compartment 53 is divided by spaced diaphragms 54 and 55 into three chambers 56, 57 and 58. The chamber 56 is in communication with the vacuum line 45 through tubes 59 and 45', which tubes are in controllable communication through a three-way valve 60. The chamber 57 is in communication with the vacuum line 46 to the clutch member 11 through a branch tube 46'. The vacuum connection with the chamber 58, which is for a separate manual control, will be hereinafter described.

The compartment 52 has a nipple 65 projecting therein from its outer end toward the compartment 53, its outer end being connected to the tube 36 leading to the brake cylinder 35, while its inner end is constantly open to the compartment 52. A diaphragm 66 is disposed across the compartment 52 in opposition to the nipple 65, which latter acts as a stop for limiting the movement in one direction of the diaphragm. In the present instance, the nipple 65 is shown as being of tubular form with its lower end notched to provide projections serving as a stop for the diaphragm 66 and also to provide passages opening communication between the compartment 52 and interior of the nipple.

A stem 67 is fixedly connected to and projects from the diaphragm 66 through a suitable gland in the partition 51 and connects to both diaphragms 54 and 55 in a manner to cause the diaphragm 66 to move outward when either diaphragm 54, 55, has such a movement imparted thereto by vacuum action. A coiled expansion spring 68 is disposed between the bottom of the partition 51 and the diaphragm 66 and serves to normally hold the diaphragm 66 in stop engagement with the nipple 65.

Leakage in any suitable manner may be provided between the chamber 52 and the portion of such chamber below the diaphragm 66 in which the spring 68 is disposed, so as to permit free inward and outward movements of the diaphragm 66.

The compartment 52, except for the valve 70 therein when closed, is in communication with the vacuum source (tank 40) through tubes 71, 72, 73 and 43. The compartment 52 also has communication with the atmosphere through a port opening 74 and housing 75, the port 74, in the present instance, being at the opposite side of said compartment to the port 76 with which the tube 71 is connected. The port 74 is closed at its outer side by an outwardly opening valve 77, while the valve 70, which closes the port 76, is inwardly opening. These valves, in the present instance, have stems projecting inwardly therefrom in parallel relation through registering bearing openings in the walls of the nipple 65. The diaphragm 66 has suitable link connection with such valve stems so that an outward movement of said diaphragm away from the nipple 65 will cause a positive opening of the valve 70 and closing of the valve 77, and vice versa.

For the purpose of this connection, the diaphragm 66, in the present instance, is provided with a U-shaped yoke 80 projecting up into the nipple 65 in straddling relation to said valve stems, which are disposed one without the other, and has one of its legs connected by a rocker 81 to the stems of the valves 70 and 77. The rocker 81 is pivoted at its inner end to the yoke 80 and projects outward therefrom through a side opening in the nipple 65 in substantially parallel relation to the associated valve stems and is pivoted to said stems at 82 and 83, respectively. Upon a lowering of the yoke 80, the rocker 81 first fulcrums about the point 82 due to the seating thrust of the valve 70, thus causing the valve 77 to be drawn inward to its seat. When the valve 77 reaches its seat, the pivot 83 then stands stationary and the continued outward movement of the yoke 80 causes the rocker to fulcrum about such point and to draw the valve 70 from its seat. It is thus apparent that upon an outward movement of the yoke 80, the air valve 77 is closed before the vacuum valve 70 is opened.

It is apparent from the above description that the line connection between the brake vacuum cylinder 35 and the vacuum source 40 is normally closed by the valve 70, so that the brake 30 is normally engaged by the action of the spring 32. Also, upon a movement of the control lever 47 to permit vacuum actuation of either clutch 6 or 7, vacuum action takes place in one or the other of the chambers 56, 57, of the relay valve 42, so as to draw the associated diaphragms outward and impart an opening movement to the valve 70 and a closing movement to the air valve 77. This places the brake cylinder 35 in communication with the vacuum source so as to effect a release of the brake at the same time one or the other of the clutches 6, 7, is engaged by vacuum action.

The chamber 58 of the relay valve 42 is connected by a tube 85 through a manual control valve 86 with the vacuum source 40, such connection, in the present instance, being through the tubes 43, 73 and 72. The valve 86 is normally closed. When it is desired to effect manual instead of automatic control of the relay valve 42, the three-way valve 60 between the tubes 45' and 59 is turned to the right to close the communication between such tubes and to open the communication between the tubes 59 and 72. This opens the vacuum chamber 56 in the relay valve 52 to vacuum action which is constant, so long as the three-way valve 60 is in such position. Such constant vacuum action on the diaphragm 54 draws the stem 67 and its diaphragm 66 downward, causing a movement of the rocker 81 to effect a closing of the air valve 77 and an opening of the vacuum valve 70, which latter opens the brake cylinder 35 to the vacuum action and maintains the brake in released position. Either clutch 6 and 7 may now be engaged by vacuum action through a manipulation of the control valve handle 47 without imparting any action to the brake 30 as such brake is already released by the constant vacuum action thereon through the relay valve. This constant or normal released action of the brake permits the platform 1 and associated parts to have a free floating movement which is desirable during some actions of the machine, and during such free floating action, either clutch may be engaged to effect the positive turning of the platform in one direction or the other. If it is desired to engage the brake at any time during an operation of the machine, the operator moves the manual control handle of the valve 86 to open the communication of the vacuum source with the relay valve chamber 58 through the tube 85. When this is done, the vacuum within the chamber 58 acts on the diaphragm 55 and draws it upward to effect a closing of the shut-off valve 70 and an opening of the air valve 77, thus releasing the vacuum action in the brake cylinder and permitting the brake to be applied by the action of its spring. The diaphragm 55 is larger than the diaphragm 54 so that the vacuum action within the chamber 58 on the diaphragm 55 is greater than the corresponding action of the diaphragm 54 within the chamber 56.

The operation of the apparatus is as follows: When the three-way valve 60 is in the position indicated in Fig. 3, which closes the communication between the tubes 59 and 72 and opens the communication between the tubes 59 and 45', the apparatus is in condition for automatic operation, wherein the brake 30 is normally applied, and is automatically released by vacuum action when the automatic control valve 44 is manipulated to permit a vacuum actuation of either clutch 6, 7, to effect an application thereof. In this automatic control of the brake, the vacuum line 72, 36, to the brake cylinder is normally closed by the valve 70, and the brake cylinder is open to the atmosphere through the port 74. When either cylinder 10, 11, is open to the vacuum source through the valve 44 to effect an application of the respective clutch 6, 7, one or the other of the chambers 56, 57, of the relay valve 52 is also open to the vacuum source through the respective tubes 46', 59, thus actuating one or the other of the diaphragms 54, 55, to move the stem 67 and its diaphragm 66 outward away from the nipple 65, thereby effecting a rocking of the rocker 81 and a consequent closing of the air valve 77 and opening of the vacuum valve 70. This places the brake cylinder 35 in communication with the vacuum source, so that the release of the brake is effected. When it is desired to place the brake 30 under manual control instead of automatic, the three-way valve 60 is turned to close the communication between the tubes 45' and 59, and to open the communication between the tubes 59 and 72. This places the chamber 56 in constant communication with a vacuum source through said tubes 59 and 72, and causes the stem 67 and its diaphragms to be held at the limit of their outward movements, in which position the shut-off valve 70 is held open and the air relief valve 77 closed. This causes the brake 30 to normally stand in released position under vacuum action and against the tension of the brake spring. Whenever it is desired to apply the brake, the operator manipulates the valve 86 to open the tube 85 and chamber 58 to the vacuum source, so that the vacuum action within said chamber acting on the diaphragm 55 will move the stem 67 and its diaphragms in an upward or inward direction to effect a closing of the shut-off valve 70 and an opening of the relief valve 77, thus releasing the vacuum action in the brake cylinder. A control of this character, whereby the releasing action of the brake may be automatic, upon the application of either clutch, or where the control of the brake may be manual so that the brake may be applied at the will of the operator at any period in an operation of the apparatus, is important in connection with the operation of certain types of mechanism with which the control may be associated, as is apparent to persons skilled in the art.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In combination, a driven member, a clutch means and a brake means associated therewith, one having an applying and the other a releasing action imparted thereto by vacuum action, a vacuum source, means establishing communication between said source and each of said clutch and brake means and including a control valve and an automatic valve, said automatic valve having a vacuum shut-off valve and a relief valve in said brake communication and also having vacuum actuated means to open said shut-off valve and close said relief valve, said control valve being operable to permit vacuum actuation of said last means and vacuum actuation of said clutch.

2. In combination, a vacuum actuated member, a vacuum source, means establishing communication between said source and member and having an automatic valve, said automatic valve including a shut-off valve for said communication and spaced diaphragms connected to said shut-off valve and each exposed at the same side thereof to vacuum action from said source and operable thereby to open said shut-off valve, said means also including a control operable to selectively expose the diaphragms to vacuum action.

3. In combination, a vacuum actuated member, a vacuum source, means establishing communication between said source and member and having an automatic valve, said automatic valve including a shut-off valve for said communication and an air inlet valve for said communication between said member and shut-off valve, said automatic valve also including spaced diaphragms, each having separate exposure at the same side thereof to the vacuum source and both connected to said shut-off and air valves to open the former and close the latter when vacuum actuated, said means also including a control operable to selectively expose the diaphragms to vacuum action.

4. In combination, a driven member, a clutch means and a brake means associated therewith and each having a predetermined action imparted thereto by vacuum action, a vacuum source, a connection between said source and clutch means, a connection between said source and brake means, a normally closed valve in said last connection, vacuum actuated means operable to open the valve, said first connection having communication with said valve, and a control in said first connection for opening and closing communication between said source and clutch means and said valve to effect a vacuum actuated action of the clutch means and an opening of said valve.

5. In combination, a driven member, a clutch and brake associated therewith, means for effecting a vacuum actuated engagement of the clutch and release of the brake, said means including a vacuum source, a communicating line between said source and clutch, a second communicating line between said source and brake, a manual control valve in said first line, and a relay valve in and normally closing said second line, said relay valve having a diaphragm exposed at one side to said first line and actuated by vacuum action to open said line when the control valve is open.

6. In a control of the class described, a driven member, a clutch and a brake associated therewith, the clutch being normally released and the brake normally engaged, a vacuum source having releasing connection with the brake, a shut-off valve normally closing said connection, said source also having a valve controlled connection both with the clutch to effect application thereof and with said valve to open same.

7. In a control of the class described, a driven member, a clutch and a brake associated therewith, the clutch being normally released and the brake normally engaged, a vacuum source having releasing connection with the brake, an automatic relay valve normally closing said connection and having a vacuum actuated diaphragm for opening the valve when subjected to vacuum action, said source also having connection with said clutch and with the diaphragm of said valve, and means for controlling said last connection to open or close connection between the source and both said clutch and said diaphragm.

8. In a control of the class described, a driven member, a clutch and a brake associated therewith, the clutch being normally released and the brake normally engaged, a vacuum source having releasing connection with the brake, an automatic relay valve normally closing said connection, said source also having a valve controlled connection with the clutch to effect application thereof and with said valve to open same, means for disconnecting said last connection from said diaphragm, and manually controlled means to effect vacuum actuated opening of said valve independently of said valve controlled connection.

9. In a control of the class described, a driven member, a drive means therefor including separate direct and reverse drive clutches, holding means for said member, a vacuum source having connection with said brake to impart predetermined action thereto, an automatic relay valve in said connection having separate diaphragms connected to the valve and each operable by vacuum action to open the valve, said source also having selective valve controlled connection with each of said clutches to apply a predetermined action thereto and each connected to a separate one of said diaphragms to effect an opening of the valve when either clutch is in operating connection with said source.

10. In a control of the class described, a driven member, a drive means therefor including separate direct and reverse drive clutches, holding means for said member, a vacuum source having connection with said holding means to impart predetermined action thereto, an automatic relay valve in said connection having separate diaphragms connected to the valve and each operable by vacuum action to open the valve, said source also having selective valve controlled connection with each of said clutches to apply a predetermined action thereto and each connected to a separate one of said diaphragms to effect an opening of the automatic valve when either clutch is in operating connection with said source, means for disconnecting one of said clutch connections from its diaphragm and to open said source to such diaphragm to normally hold said automatic valve open, and means connecting said source and automatic valve and manually controlled to effect an opening of the automatic valve.

11. In combination, a driven member, drive means therefor in separate clutch connection therewith to drive it in one direction or the other, a holding means for said member, a vacuum source having separate operating connections with said holding means and each clutch to release the holding means and apply the clutches by vacuum action, a normally closed automatic control for the holding means connection and in operating connection with each of said clutch connections to cause said control to open when the connection to either clutch is open, and means operable to open or close either clutch connection.

12. In combination, a driven member, drive means therefor in separate clutch connection therewith to drive it in one direction or the other, a holding means for said member, a vacuum source having separate operating connections with said holding means and each clutch to release the holding means and apply the clutches by vacuum action, an automatic valve in said holding means connection, means connected to and normally operating to close said valve, said last means having communication with each of said clutch connections and operable by vacuum action therein to effect an opening of said valve when either clutch connection is opened to the vacuum source, and manual control means for said clutch connections.

13. In combination, a driven member, drive means in clutch connection therewith, a holding means for said member, a vacuum source having separate operating connections with said holding means and said clutch to release the holding means and apply the clutch by vacuum action an automatic valve normally closing said holding means connection, an operating means for said valve normally holding it in closed position and vacuum actuated to open the valve, a manual control in said clutch connection to open or close said connection with the source, and a connection between said operating means and clutch connection to effect vacuum actuation of the operating means to open said valve when the control in said clutch connection is open.

14. In combination, a driven member, drive means in clutch connection therewith, a holding means for said member, a vacuum source having separate operating connections with said holding means and said clutch to release the holding means and apply the clutch by vacuum action, an automatic valve normally closing said holding means connection, an operating means for said valve normally holding it in closed position and vacuum actuated to open the valve, a manual control in said clutch connection to open or close said connection with the source, and a connection between said operating means and clutch connection to effect vacuum actuation of the operating means to open said valve when the control in said clutch connection is open, means operable to close the connection between said operating means and clutch connection and to open said operating connection to said holding means connection at the source side of said valve to cause actuation of the operating means to normally hold said valve open, and a separate manually controlled connection between said operating means and source adapted when open to permit vacuum actuation of the operating means to close said valve.

15. In combination, a vacuum actuated member, a vacuum source, a connection between said member and source, a valve for closing said connection, an operating means for said valve including a plurality of diaphragms having connection with the valve, a second and third connection between said diaphragms and source, each having a control therein, whereby when one connection is opened and the other closed the valve is held opened by vacuum action on the associated diaphragm, and vice versa, means for closing one of said second and third connections to said source and opening it to said first connection to cause the valve to be normally held open by vacuum action from said first connection when the other of said second and third connections is closed to the vacuum source.

16. In combination, a line having fluid pressure therein differing from atmospheric pressure, a shut-off valve and a relief valve in said line, means connected to each valve and operable to close one and open the other and vice versa, and separate controlled means, one of which is operable to actuate said first means to close the shut-off valve and open the relief valve and the other being operable to actuate said first means to impart opposite movements to said valves from those imparted by the companion means.

17. In combination, a line having fluid pressure therein differing from atmospheric pressure, a differential fluid pressure source in connection with said line, a shut-off valve in said line, means forming a plurality of chambers with movable diaphragms therein, connection between said diaphragms and valve operable by predetermined movements of the diaphragms to open or close the valve, separate controlled connections between said source and different of said chambers to cause the differential fluid pressure to act through one connection on one diaphragm to close the valve and through another connection on another diaphragm to open the valve, and a relief valve in said line connected to the shut-off valve and automatically movable to open position when the shut-off valve is closed, and vice versa.

18. In combination, a line having fluid pressure therein differing from atmospheric pressure, a differential fluid pressure source in connection with said line, a normally closed shut-off valve in said line, means forming three chambers divided by diaphragms, two separate connections between said source and two of said chambers, a common control in said two connections to open either connection to its chamber to permit differential fluid pressure to act on its diaphragm to open said shut-off valve, means operable to cause at least one of said connections to be normally open to said source to maintain the valve in open position, and a third controlled connection between said source and one of said chambers adapted when open to permit differential fluid pressure to act on the associated diaphragm to close the valve.

19. In combination, a line having fluid pressure therein differing from atmospheric pressure, a differential fluid pressure source in connection with said line, a shut-off valve in said line, means connected to and acting on said valve to normally hold it in closed position, and operable to pneumatically impart opening and closing movements of said valve, said last means including at least three separate connections between said source and first means, a common control in two of said connections operable to open either connection to permit differential fluid pressure actuated opening movements of said valve, means operable to cause at least one of said connections to be normally open to said source to maintain the valve in open position, a third one of said connections permitting differential fluid pressure from said source to act on said first means to close said valve, and a manual control in said third connection.

20. In combination, a normally released clutch and a normally engaged brake, means pneumatically operable to engage said clutch, means pneumatically operable to release said brake, a valve associated with said last means and movable to closed position to render said last means inoperative, means acting to normally retain said valve closed, means pneumatically operable to open said valve when said first means operates to engage the clutch, means for rendering said last means non-sensitive to a clutch engaging action of said first means and adapted to cause it to act to normally hold the valve open, and manually controlled means pneumatically operable to close the valve against said pneumatic opening pressure means.

21. In combination, a driven member, a drive therefor including two separate normally released clutches for driving it in one direction or the other and a normally engaged brake, means pneumatically operable to selectively engage either clutch, means pneumatically operable to release said brake, a valve associated with said last means and movable to closed position to render said last means inoperative, means acting to normally retain said valve closed, means pneumatically operable to open said valve when said first means operates to engage either clutch, means for rendering said last means non-sensitive to clutch engaging action of said first means and adapted to cause it to act to normally hold the valve open, and manually controlled means pneumatically operable to close the valve against said pneumatic opening pressure means.

GEORGE E. MILLER.